No. 849,560. PATENTED APR. 9, 1907.
J. F. O'CONNOR.
FRICTION SPRING DRAFT RIGGING FOR RAILWAY CARS.
APPLICATION FILED DEC. 14, 1906.

2 SHEETS—SHEET 1.

Witnesses:

Inventor:
John F. O'Connor
By Munday, Evarts, Adcock & Clarke.
Attorneys

No. 849,560. PATENTED APR. 9, 1907.
J. F. O'CONNOR.
FRICTION SPRING DRAFT RIGGING FOR RAILWAY CARS.
APPLICATION FILED DEC. 14, 1906.
2 SHEETS—SHEET 2.
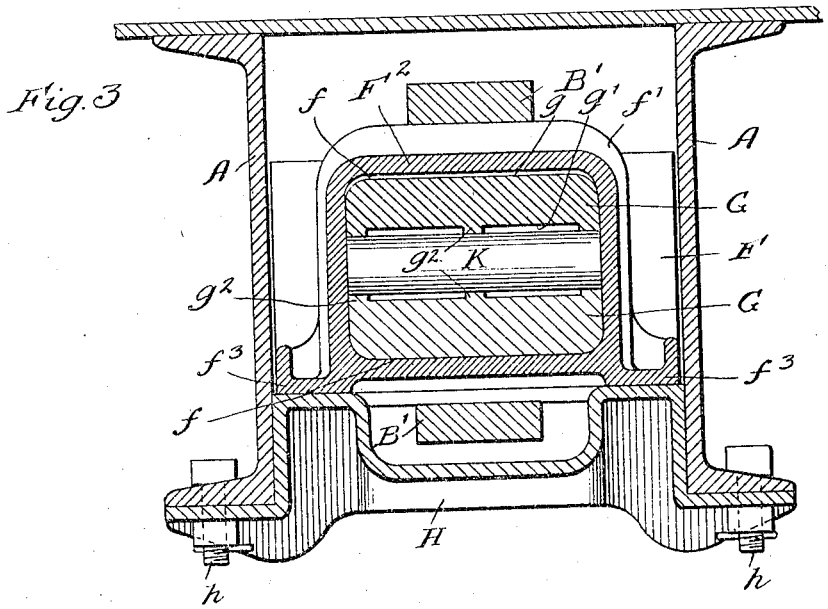
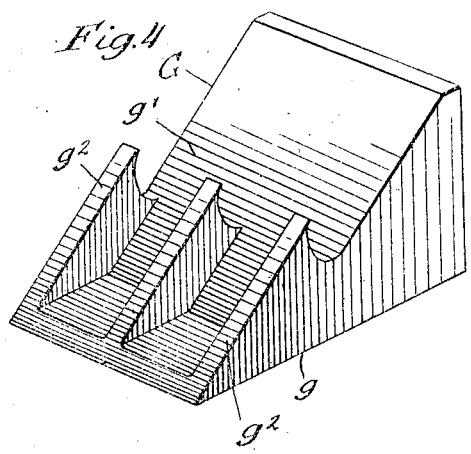
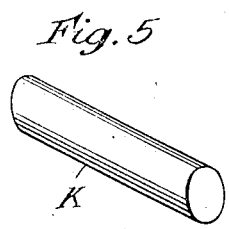
Witnesses:
Wm. Geiger
H. M. Munday
Inventor:
John F. O'Connor
By Munday, Evarts, Adcock & Clark.
Attorneys

UNITED STATES PATENT OFFICE.

JOHN F. O'CONNOR, OF CHICAGO, ILLINOIS, ASSIGNOR TO W. H. MINER COMPANY, OF CHICAGO, ILLINOIS, A CORPORATION OF ILLINOIS.

FRICTION SPRING DRAFT-RIGGING FOR RAILWAY-CARS.

No. 849,560.     Specification of Letters Patent.     Patented April 9, 1907.

Application filed December 14, 1906. Serial No. 347,769.

*To all whom it may concern:*

Be it known that I, JOHN F. O'CONNOR, a citizen of the United States, residing in Chicago, in the county of Cook and State of Illinois, have invented a new and useful Improvement in Friction Spring Draft-Rigging for Railway-Cars, of which the following is a specification.

My invention relates to friction spring draft-rigging for railway-cars.

Difficulty has heretofore been experienced in practical use of friction draft-gear owing to the tendency of the spreader or load-distributing mechanism sticking or being uncertain or irregular in action and violent in movement when motion begins, thus greatly reducing the effective absorption of work by the friction-surfaces; and the object of my invention is to provide a simple, strong, efficient, and durable construction of friction spring draft-rigging that will practically overcome this objectionable difficulty and enable the friction devices to uniformly and reliably exert or produce a positive predetermined resistance or cushioning effect.

My invention consists in the means I employ to practically accomplish this object or result—that is to say, it consists, in connection with the draw-bar and draw-bar strap or yoke and the coöperating draft-rigging stops on the car-frame and a direct-acting spring arranged longitudinally of the draw-bar, of a longitudinally-movable friction shell or case and interengaging friction-blocks having inclined or wedging faces with an antifriction device or roller interposed between the coöperating inclined or wedging faces of the friction-blocks to prevent sticking and cause the friction-blocks to properly and uniformly act.

My invention also consists in the novel construction of parts and devices and in the novel combinations of parts and devices herein shown and described.

Figure 1:
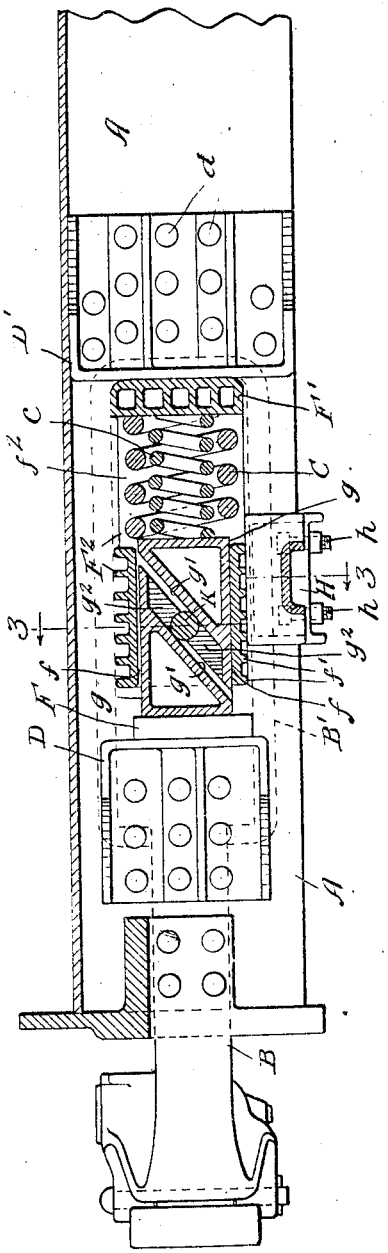
Figure 2:
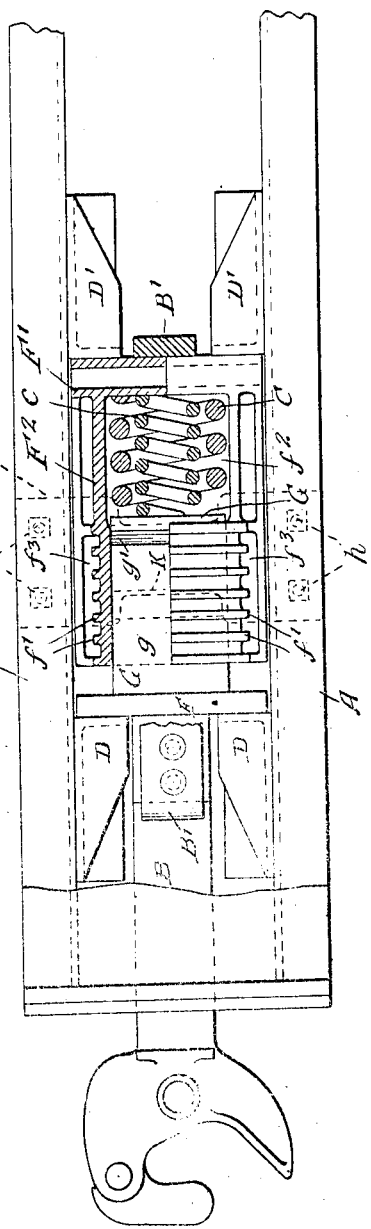

In the accompanying drawings, forming a part of this specification, Figure 1 is a central vertical longitudinal section of a friction spring draft-rigging embodying my invention. Fig. 2 is a plan view partly in horizontal section. Fig. 3 is a vertical cross-section on line 3 3 of Fig. 1. Fig. 4 is a detail perspective view of one of the friction-blocks, and Fig. 5 is a detail perspective view of the antifriction device or roller.

In the drawings, A represents the center sills or framework of the car to which the draft-rigging is applied; B, the draw-bar; B', the draw-bar yoke or strap, and C $c$ the longitudinally-arranged direct-acting draft-rigging springs interposed between the draw-bar or draw-bar strap and the stationary draft-rigging stops D D', which are secured to the center sills or car-framework, preferably by rivets $d$.

F F' are the front and rear followers, adapted to alternately engage the stops D D and D' D' and coöperate with the draw-bar and its strap or yoke and the spring C.

$F^2$ is a longitudinally-movable friction shell or case, preferably made integral with the rear follower and having inside parallel longitudinally-extending friction-faces $f$ and exterior transverse strengthening-ribs $f'$, surrounding the friction-face portion of the shell to prevent the friction-blocks G G from bursting or breaking the friction-shell. The friction shell or case $F^2$ is cut away at its top and bottom walls adjacent to the spring or furnished with openings $f^2$ to lighten the casting and afford an opening for convenient insertion and removal of the spring C. The shell $F^2$ is further provided on each side at its bottom with a laterally-projecting guide or flange $f^3$ to engage the removable bottom tie-plate or guide H, which is secured by bolts $h$ to the center sills or stationary frame-pieces A, to which the draft-rigging is applied.

The friction-blocks G G have longitudinally-extending friction-faces $g$ $g$ in sliding frictional engagement with and parallel to the coöperating friction-faces $f$ $f$ of the friction-shell $F^2$ and producing therewith a powerful frictional resistance under both pulling and buffing strains. These friction-blocks are also provided with inclined or wedging meeting or adjacent faces $g'$ $g'$, between which is interposed an antifriction device or roller K, preferably maintained in position by saddles or shouldered ribs $g^2$ $g^2$ on the blocks G G.

I prefer to provide the sliding friction-blocks G G with inclined wedging-faces instead of employing two sets of blocks, one set bearing the sliding friction-faces $g$ $g$ and another separate set bearing the wedging-faces $g'$ $g'$, as it simplifies the construction and reduces the number of parts.

I claim—

1. In a friction spring draft-rigging, the combination with the draw-bar, draw-bar strap, direct-acting spring in line with the draw-bar, stops and followers, of a longitudinally-movable friction shell or case, coöperating sliding friction-blocks having inclined or wedging faces, and an antifriction-roller interposed between the inclined or wedging faces of said blocks and having a rolling action on both said faces, substantially as specified.

2. In a friction spring draft-rigging, the combination with the draw-bar, draw-bar strap, direct-acting spring in line with the draw-bar, stops and followers, of a longitudinally-movable friction shell or case, coöperating sliding friction-blocks having inclined or wedging faces, and an antifriction device interposed between the inclined or wedging faces of said blocks and having a rolling action on both said faces, said blocks being provided with coöperating saddles to keep the antifriction device in place while permitting the same to roll on the wedging-faces of both blocks, substantially as specified.

3. In a friction draft-rigging, the combination with the draw-bar and direct-acting spring in line with the draw-bar sliding friction devices and having inclined faces for forcing the friction-faces of the friction devices together, of an antifriction device interposed between the inclined faces and having a rolling action on both said faces, substantially as specified.

4. In a friction draft-rigging, the combination with the draw-bar draft-rigging stops and springs, of friction-blocks having inclined faces, and a roller interposed between the inclined faces of adjacent blocks and having a rolling action on both said faces, substantially as specified.

5. In a friction draft-rigging, the combination with the draw-bar, draft-rigging stops and springs, of friction-blocks having inclined faces, and a roller interposed between the inclined faces of adjacent blocks and having a rolling action on both said faces, the adjacent blocks having saddles to support the roller in position, substantially as specified.

6. In a friction draft-rigging, the combination with a draw-bar and direct-acting spring in line with the draw-bar movable friction-shell, of coöperating friction-blocks having inclined or wedging faces, and a roller interposed between the inclined or wedging faces of said blocks and having a rolling action on both said faces, substantially as specified.

JOHN F. O'CONNOR.

Witnesses:
H. M. MUNDAY,
HENRY LOVE CLARKE.